(12) United States Patent
Wilson, II et al.

(10) Patent No.: US 12,103,022 B2
(45) Date of Patent: Oct. 1, 2024

(54) DISPENSING TIP ASSEMBLY INCLUDING FOODSTUFF ADDITIVE DISPENSER FOR PRESSURIZED FOODSTUFF CONTAINER

(71) Applicant: Clayton Corporation, Fenton, MO (US)

(72) Inventors: James David Wilson, II, Collinsville, IL (US); Brennan Fogarty, High Ridge, MO (US); Kevin Robert Martz, Desoto, MO (US)

(73) Assignee: Clayton Corporation, Fenton, MO (US)

( * ) Notice: Subject to any disclaimer, the term of this patent is extended or adjusted under 35 U.S.C. 154(b) by 0 days.

(21) Appl. No.: 18/631,325

(22) Filed: Apr. 10, 2024

(65) Prior Publication Data

US 2024/0253070 A1 Aug. 1, 2024

Related U.S. Application Data

(63) Continuation of application No. 18/464,622, filed on Sep. 11, 2023.

(60) Provisional application No. 63/484,915, filed on Feb. 14, 2023, provisional application No. 63/375,118, filed on Sep. 9, 2022.

(51) Int. Cl.
B05B 11/00 (2023.01)
(52) U.S. Cl.
CPC ........ B05B 11/0038 (2018.08); B05B 11/007 (2013.01); B05B 11/0072 (2013.01)

(58) Field of Classification Search
CPC B05B 11/0038; B05B 11/007; B05B 11/0072
USPC .......................................................... 222/129
See application file for complete search history.

(56) References Cited

U.S. PATENT DOCUMENTS

| | | | |
|---|---|---|---|
| 3,896,971 A | 7/1975 | Schwede | |
| 5,007,563 A | 4/1991 | de Laforcade | |
| 5,848,729 A | 12/1998 | Thornton | |
| 6,607,106 B2 | 8/2003 | Henry et al. | |
| 11,090,666 B1 * | 8/2021 | Luckow | B65D 83/66 |
| 11,534,781 B2 * | 12/2022 | Luckow | B65D 83/28 |
| 2021/0229121 A1 * | 7/2021 | Luckow | B65D 83/30 |
| 2021/0362174 A1 * | 11/2021 | Luckow | B65D 83/30 |
| 2022/0054734 A1 * | 2/2022 | Krueger | A61M 3/0208 |

(Continued)

OTHER PUBLICATIONS

International Search Report / Written Opinion for PCT/US2023/073844, Jan. 23, 2024, 11 pages, United States.

*Primary Examiner* — Jeremy Carroll
(74) *Attorney, Agent, or Firm* — Stinson LLP

(57) ABSTRACT

A dispensing tip assembly includes a foodstuff additive dispenser for a pressurized foodstuff container. A tip body of the dispensing tip assembly may have low pressure zone in which fluid pressure is lower than fluid pressure upstream of the low pressure zone as flowable foodstuff from the foodstuff container flows through the internal flow passage toward an open downstream end of the tip body. The dispenser tip assembly may include one or more of duckbill valves tethered to one another, and/or a plurality of injection ports and/or structure for one-direction dispensing, and/or internal fins to couple to an actuator of the foodstuff container, and/or an anti-rotation device, and/or a collar for attaching a bulb or pod of the tip body, and/or an ergonomic and functional bulb.

12 Claims, 21 Drawing Sheets

(56) References Cited

U.S. PATENT DOCUMENTS

2023/0131580 A1\* 4/2023 Luckow ............ B65D 83/0055
222/94

\* cited by examiner

DISPENSING TIP ASSEMBLY INCLUDING FOODSTUFF ADDITIVE DISPENSER FOR PRESSURIZED FOODSTUFF CONTAINER

CROSS-REFERENCE TO RELATED APPLICATIONS

The present application is a continuation application of U.S. Non-Provisional application Ser. No. 18/464,622, filed Sep. 11, 2023, which claims the benefit of U.S. Provisional Application Ser. No. 63/484,915, filed Feb. 14, 2023 and U.S. Provisional Application Ser. No. 63/375,118, filed Sep. 9, 2022.

FIELD OF THE DISCLOSURE

The present disclosure generally relates to a dispensing tip assembly including a foodstuff additive dispenser for a pressurized foodstuff container.

BACKGROUND OF THE DISCLOSURE

U.S. Pat. No. 11,090,666 describes a device, which is shown in FIG. 1 of the present application. The '066 Patent discloses a nozzle and a pod coupled to the nozzle for dispensing an additive or agent. The pod includes a pod outer plate, a pod inner plate, and a pod elastomer. Individual valves of the pod enable foodstuff additive to be dispensed from the pod when the elastomer is depressed.

SUMMARY

In one aspect, a dispensing tip assembly for a flowable foodstuff container generally comprises a tip body having an upstream end and an open downstream end and defining an internal flow passage extending therebetween through which flowable foodstuff from the flowable foodstuff container flows; and a foodstuff additive dispenser coupled to the tip body, the foodstuff additive dispenser configured to contain a foodstuff additive therein and selectively enable delivery of the foodstuff additive into the internal flow passage of the tip body. The internal flow passage has low pressure zone in which fluid pressure is lower than fluid pressure upstream of the low pressure zone as the flowable foodstuff from the foodstuff container flows through the internal flow passage toward the open downstream end.

In another aspect, a dispensing tip assembly for a flowable foodstuff container generally comprises a tip body having an upstream end and an open downstream end and defining an internal flow passage extending therebetween through which flowable foodstuff from the container flows; and a foodstuff additive dispenser coupled to the tip body, the foodstuff additive dispenser configured to selectively enable delivery of the foodstuff additive into the internal flow passage of the tip body. The tip body includes a ramp on an interior surface thereof, the ramp including an upstream side, a downstream side, and an apex section between the upstream and downstream sides, wherein the apex section of the ramp at least partially defines a throat of the internal flow passage having a cross-sectional area that is less than a cross-sectional area of the internal flow passage upstream and downstream of the throat.

Other aspects are described above. The dispenser tip assembly may include one or more of duckbill valves tethered to one another, and/or a plurality of injection ports and/or structure for one-direction dispensing, and/or internal fins to couple to an actuator of the foodstuff container, and/or an anti-rotation device, and/or a collar for attaching a bulb or pod of the tip body, and/or an ergonomic and functional bulb. A method of assembling the dispenser tip assembly is also described. Other aspects are also described.

DETAILED DESCRIPTION OF THE DISCLOSURE

Figure 1:
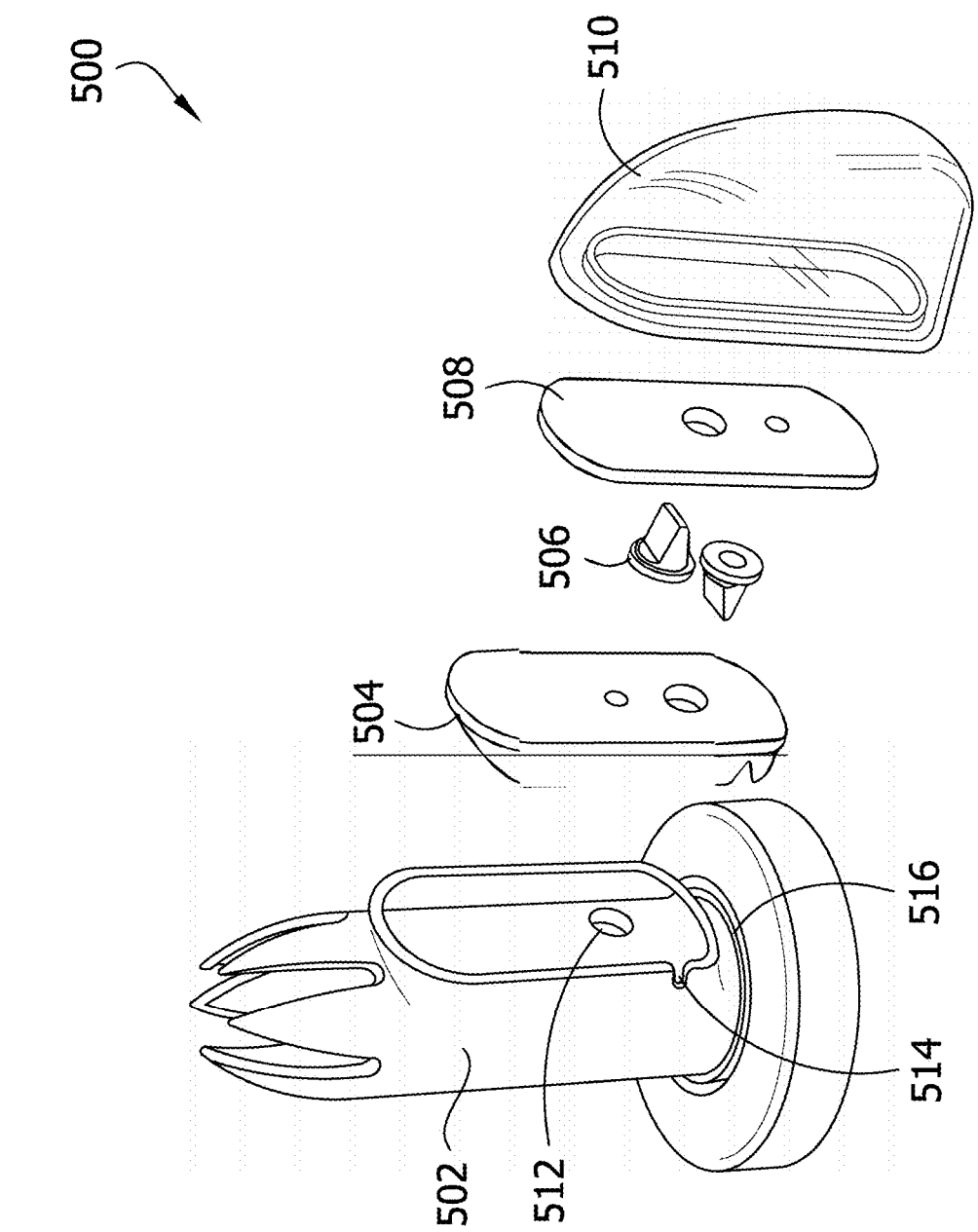
FIG. 1 is a prior art device discussed in the background section.
Figure 2A:
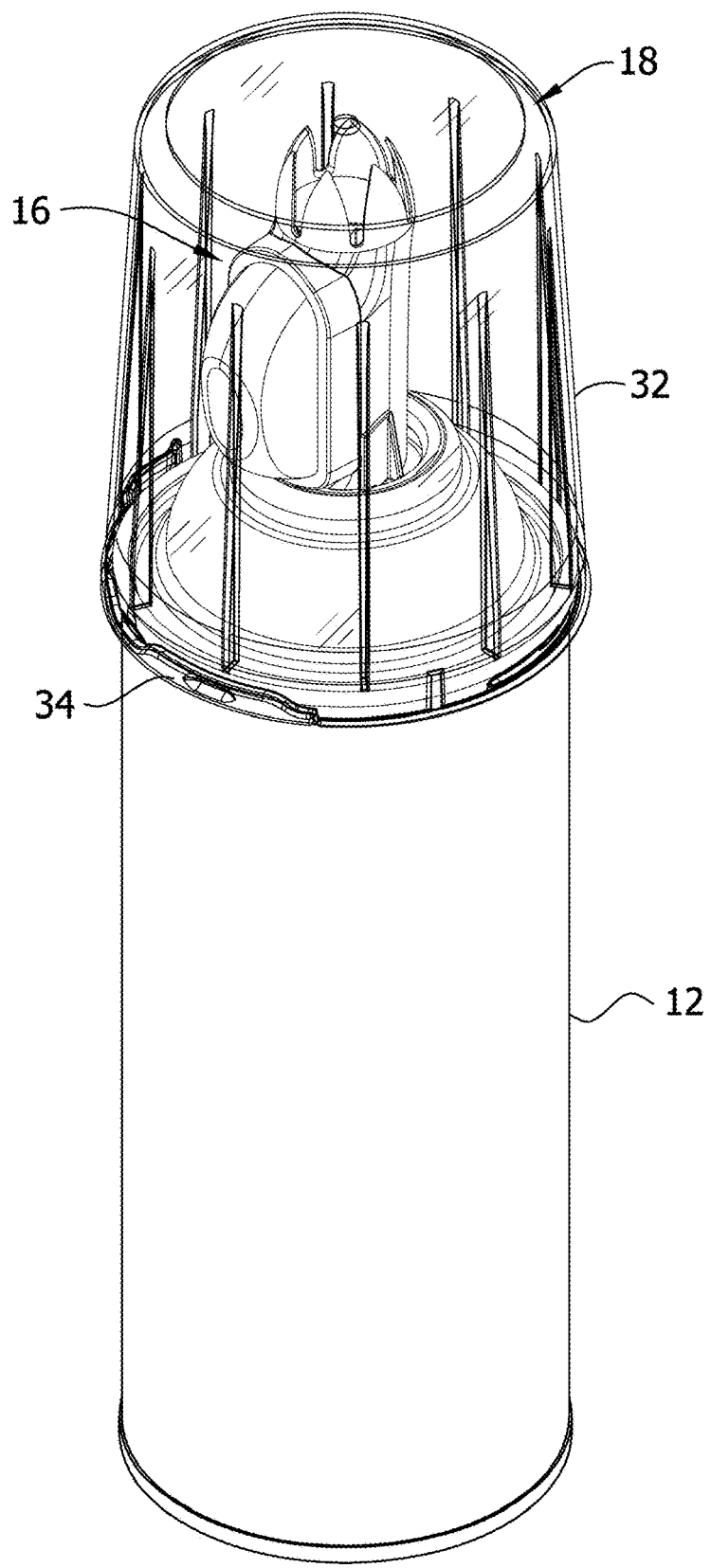
FIG. 2A is a perspective of a foodstuff container.
Figure 19:
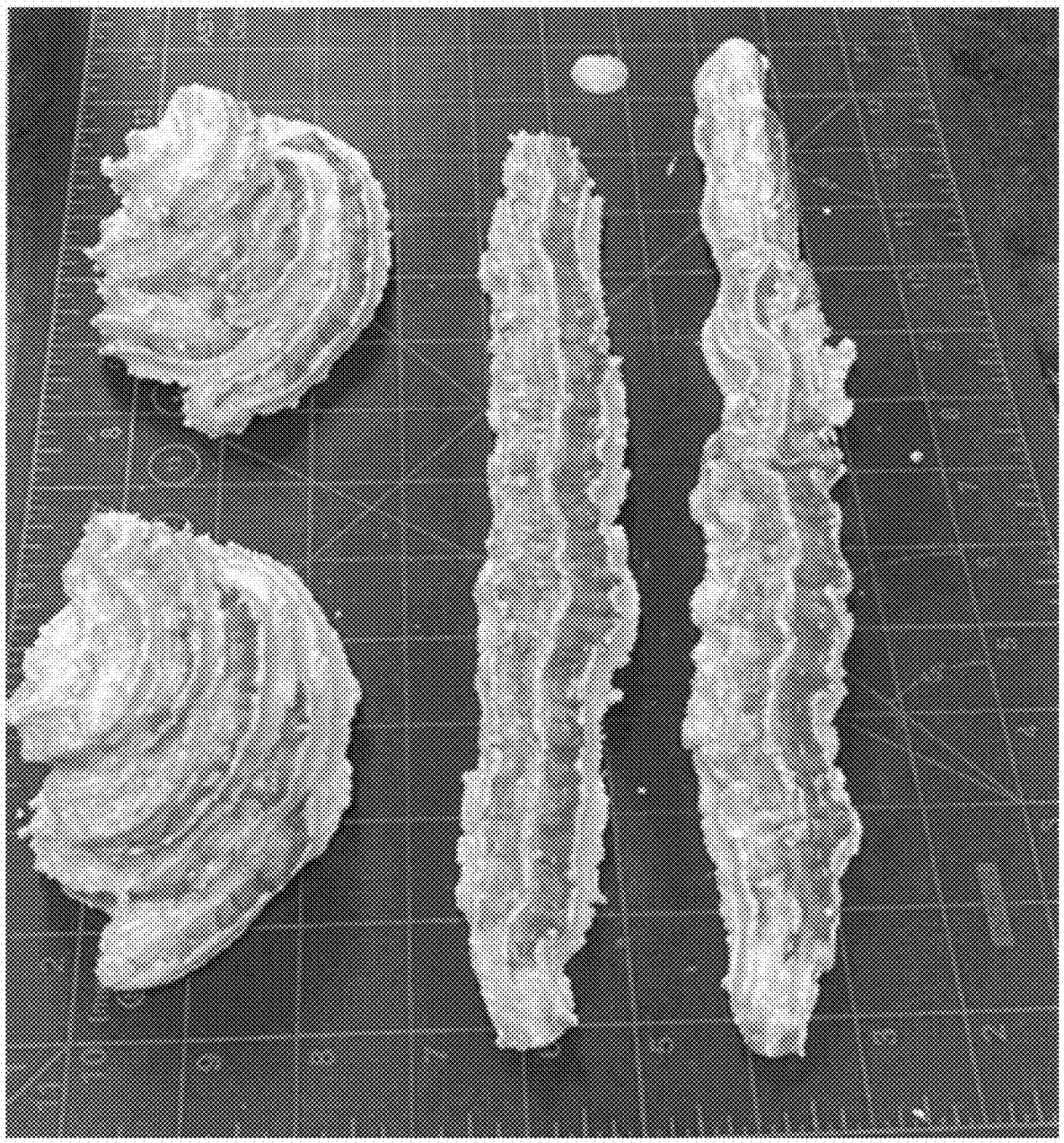
FIG. 19 is a photo of dispensed whipped cream including the additive foodstuff as dispensed from the dispensing tip assembly.

Referring to FIG. 2, a pressurizable foodstuff container (or can) of an embodiment of the present disclosure is generally indicated at reference numeral 10. In general, the foodstuff container comprises a container body 12; a foodstuff valve assembly 14 coupled to the container body; a dispensing tip assembly, generally indicated at reference numeral 16, coupled to the valve assembly and/or the container body; and a packaging cap 18 coupled to the container body. The container body 12 is configured to contain a pressurized, flowable foodstuff product therein. For example, the foodstuff product may be an aerosol product. The dispensing tip assembly 16 is configured to selectively dispense a foodstuff additive to the foodstuff product as the foodstuff product flows through the tip assembly and is dispensed from the foodstuff container 10. In one non-limiting example, the foodstuff additive is dispensed as a stripe or in a line on the foodstuff as the foodstuff flows through the dispensing tip assembly 16, such as shown in FIG. 19. With respect to whipped cream as the foodstuff product, for example, the foodstuff additive may be dispensed having an appearance of a swirled line or stripe on the exterior of the dispensed whipped cream. The foodstuff additive may have a distinguishable color and flavor for enhancing the whipped cream or other foodstuff. For example, the foodstuff additive may have a fruit taste (e.g., strawberry, cherry, blueberry, etc.) or a peanut butter taste or chocolate taste or a candy or confectionary taste. The orientation of the foodstuff container 10 and its components in the drawings provides the point of reference for the terms defining relative locations and positions of structures and components of the container, including but not limited to the terms "upper," "lower," "top," "bottom," "upward," and "downward," as used throughout the present disclosure. The terms "downstream" and "upstream" relate to the direction of flow of the flowable foodstuff product within the dispending tip assembly 16 during use, and may be used as relative terms with respect to one another. The term "proximal" generally corresponds to the term downstream, and the term "distal" generally corresponds to the term upstream.

Figure 4:
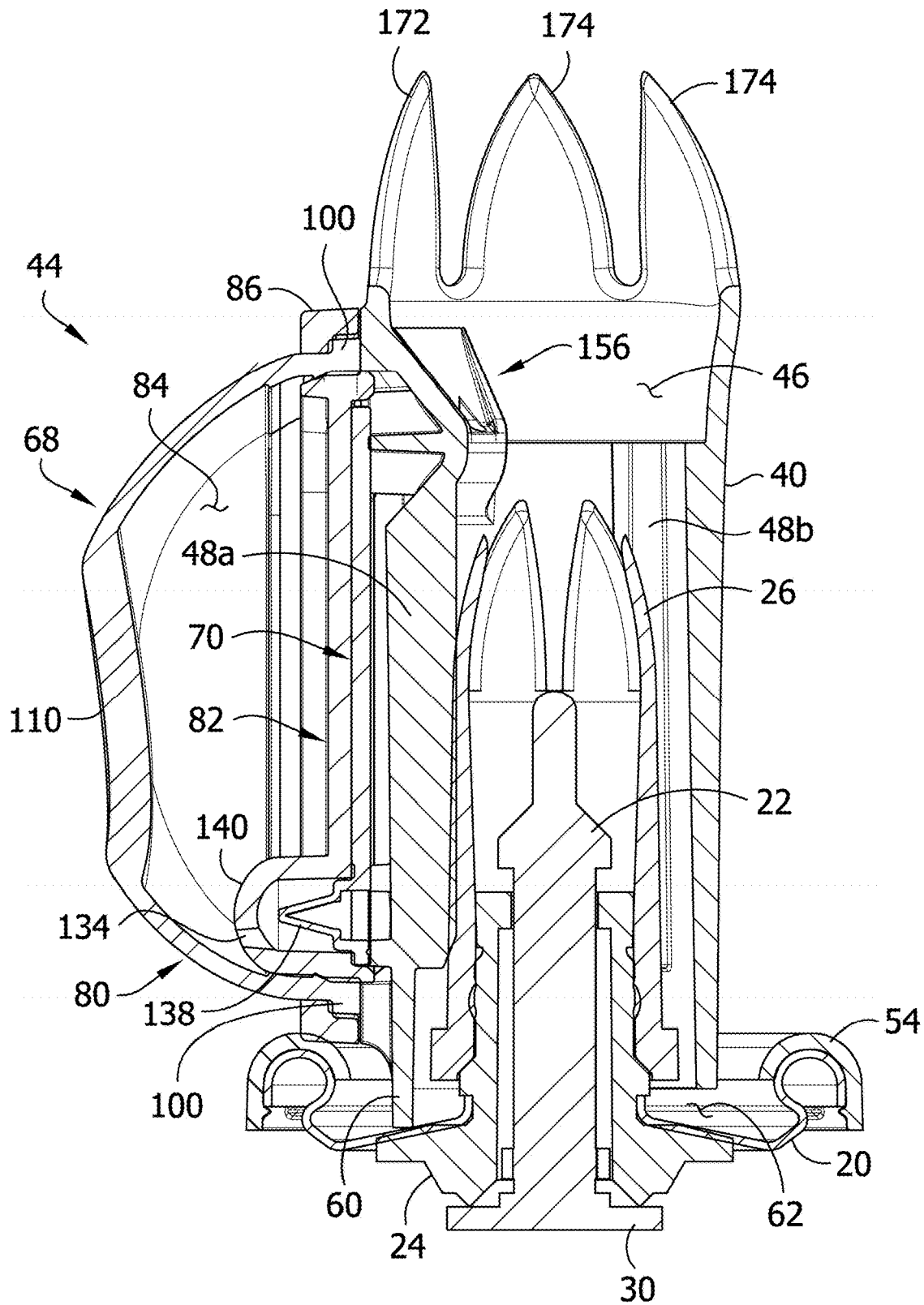
FIG. 4 is a cross section of the dispensing tip assembly coupled to a valve assembly, taken in a plane through an air valve.

Referring to FIG. 4, a non-limiting embodiment of the illustrated foodstuff valve assembly 14 is a conventional valve assembly, which will be described herein briefly. It is understood that the foodstuff valve assembly 14 may be of other types and configurations suitable for a pressurized foodstuff container. The foodstuff valve assembly 14 is generally in the form of a toggle valve. The foodstuff valve assembly 14 assembly comprises a mounting cup 20 couplable to an open top of the container body 12, a stem 22, and a seal 24 (e.g., a grommet), attached to the stem and disposed between and interconnecting the stem and the mounting cup. The illustrated foodstuff valve assembly 14 also includes an actuator or tip 26 (e.g., a conventional actuator or tip) coupled to the seal 24, although in other embodiments the valve assembly tip may be omitted. As is generally known in the art, a lower disc 30 (or seat) of the stem 22 sealingly seats against a lower portion of the seal 24 to form a leak proof seal therebetween when the valve is closed (e.g., in a non-actuated position, such as shown in FIG. 4). Tilting or pivoting of the stem 22 (such as by tilting or pivoting the tip) unseats the lower disc 30 from the seal 24 so that the pressurized, flowable foodstuff product in the container body 12 flows between the disc and the seal and along or through the stem and out of the tip 26, for example. As described above, the foodstuff valve assembly 14 may be of another type, including by not limited to a vertically-actuated valve, or a spring-valve (i.e., a valve that uses a metal spring for closing the valve), or other suitable valve.

Referring to FIG. 2, the packaging cap 18 is configured to be coupled on the container body 12 over the dispensing tip assembly 16. The packaging cap 18 may include a tamper-evident device coupling the cap 18 to the container body 12. For example, the cap 18 may include a cap body 32 and a removable tab or strip 34 including ribs or cleats that engage the container body 12. Upon removing the tab or strip 34 from the cap body, the cap body can be removed from the container body 12. The cap body 32 may include ribs or cleats that engage the container body 12 and allow the cap body to removably snap-fit onto the container body after the removable tab or strip 34 is removed. The packaging cap 18 may be of other configurations and designs in other embodiments.

Referring to FIGS. 3-7, the dispensing tip assembly 16 generally includes a tip body 40 and a foodstuff additive dispenser 44 coupled to the tip body. The tip body 40 defines an internal flow passage 46 for receiving and dispensing the foodstuff product and the foodstuff additive (together, the dispensed combined product). The illustrated tip body 40 is configured to couple to the valve tip 26 by a friction fit or in other ways. In particular, interior ribs 48a, 48b in the internal passage engage the valve tip 26. In this way, the dispensing tip assembly 16 can be readily added (and removed) from a flowable product container that includes the valve assembly 14 and tip 26. In the illustrated embodiment, the ribs include a fixed rib 48a and two deflectable ribs 48b. The deflectable ribs 48b are more adjacent one another than to the fixed rib 48a around the interior of the tip body 40. The deflectable ribs 48b are configured to deflect or flex (e.g., resiliently flex) away from one another to enable the tip body 40 to couple to off-the-shelf tips 26 of different circumferences. Through this design, the dispensing tip assembly 16, including the additive foodstuff therein, can be sold separately from the foodstuff can (e.g., the container body 12, the foodstuff valve assembly 14, and the off-the-shelf tip 26), whereby the consumer can purchase the foodstuff can from a third party and then couple the dispensing tip assembly to the foodstuff can. For example, a consumer may separately purchase the dispensing tip assembly 16 including a flavored gel or other fluid (e.g., fruit-flavored, confectionary-flavored, or other flavored fluid) and a non-flavored (or flavored) aerosol whipped cream can. By simply coupling the dispensing tip assembly 16 to the tip of the off-the-shelf aerosol can, the consumer is able to dispense whipped cream with a flavored gel stripe. In other embodiments, the dispensing tip assembly 16 can be coupled to the foodstuff valve assembly 14 or container body 12 in other suitable ways.

Figure 2B:
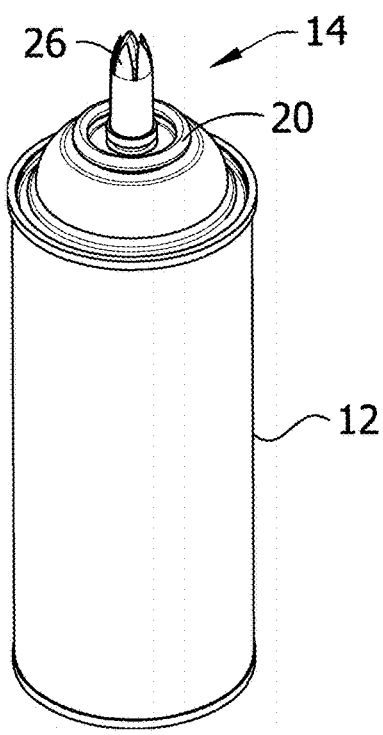
FIG. 2B is an exploded view of FIG. 2A.
Figure 3:
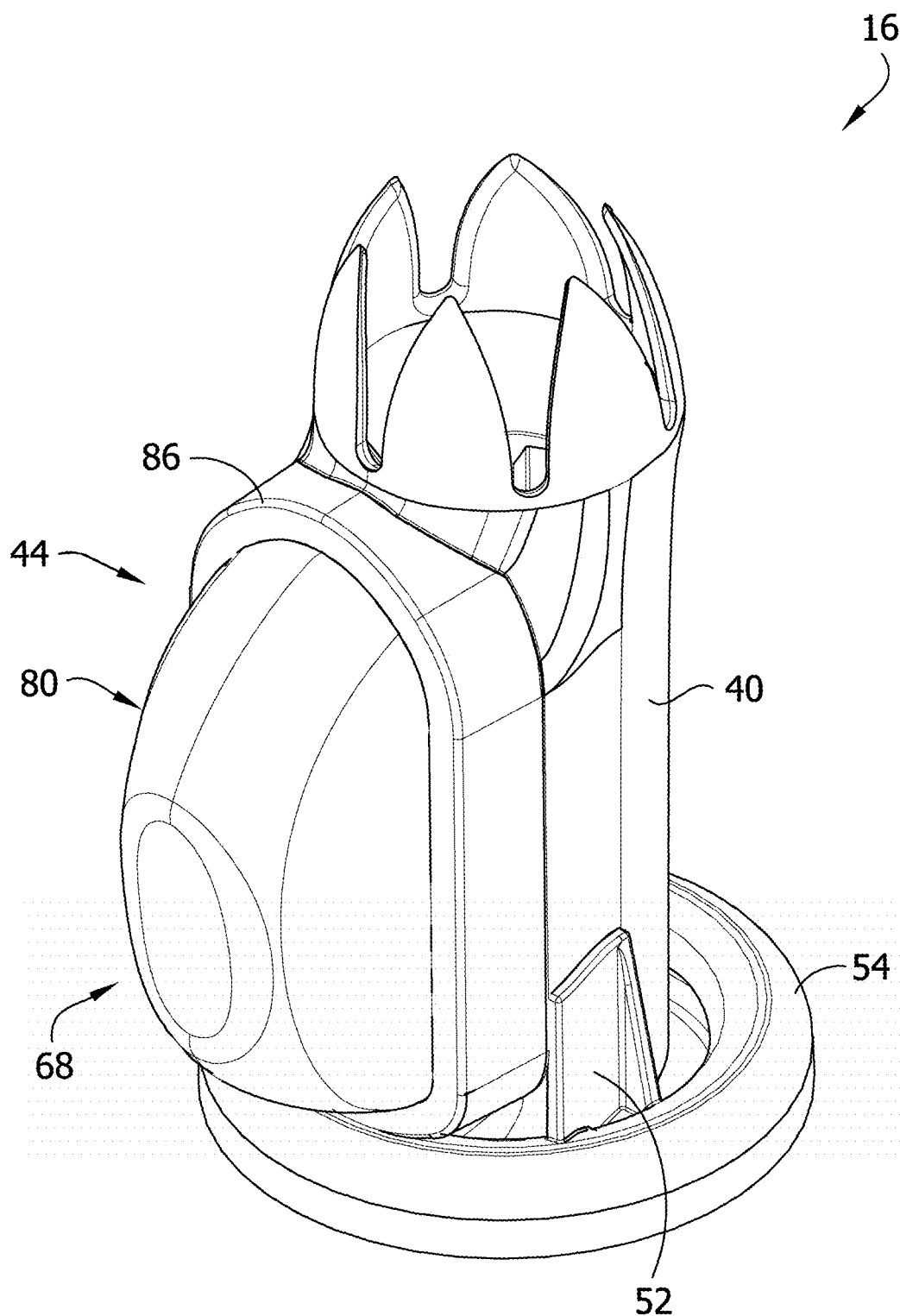
FIG. 3 is a perspective view of dispensing tip assembly.

Referring to FIGS. 2B and 3, in the illustrated embodiment, the dispensing tip assembly 16 is configured to be pivotable or tiltable in a single plane. To this end, the foodstuff container 10 further includes a track or guide 50 comprising opposing posts 52 (or stops) between which the tip assembly 16 is received. The tip assembly 16 is captured between the posts 52 so that the tip assembly is pivotable in a single plane between the posts. The posts 52 also inhibit rotation of the tip assembly 16 on the foodstuff valve assembly 14. The illustrated posts 52 are provided on a ring 54 that snaps onto or is otherwise couplable to the valve assembly 14 or container body 12 (e.g., mounting cup). In one or more other embodiments, the posts 52 may be integrally formed with the dispensing tip assembly 16, for example, or otherwise configured to track or guide the dispensing tip assembly in a single plane. In the illustrated embodiment (FIG. 4), the tip body 40 includes a stop 60 at its lower end and a clearance 62 at a diametrically opposite portion of its lower end to enable the tip body to pivot or rotate in only single direction. In particular, the dispensing tip assembly 16 can be pivoted or tilted by applying a transverse to the foodstuff additive dispenser 44, and a force applied to the opposite side of the tip body 40 is inhibited from pivoting the dispensing tip assembly due to the stop 60. Other designs and configurations may be possible in other embodiments.

Figure 7:
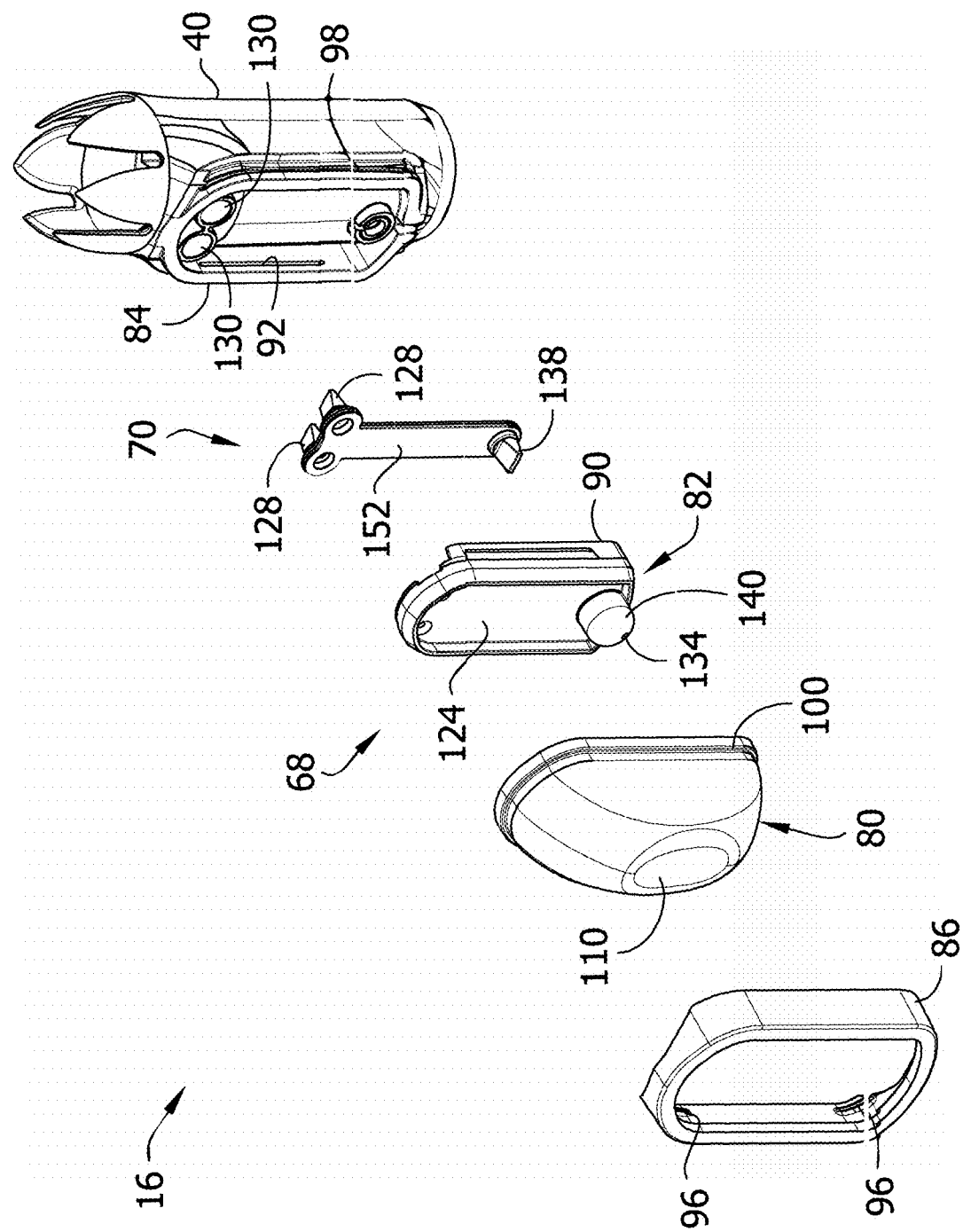
FIG. 7 is an exploded view of the dispensing tip assembly.

Referring to FIGS. 3 and 7, in particular, the foodstuff additive dispenser 44 includes a pod 68 for the foodstuff additive, and an additive valve assembly 70 (FIG. 7) configured to fluidly connect the pod to the tip body 40 and regulate the dispensing of the foodstuff additive into the passage 46 of the tip body 40. The pod 68 includes a resiliently compressible bulb 80 coupled to a manifold plate 82 to define an interior chamber 84 (FIGS. 4-6) configured to contain the foodstuff additive therein. In one embodiment, the manifold plate 82 is connectable to the tip body 40 by mateable connectors (e.g., snap-fit connectors) and the bulb 80 is connectable to the manifold plate and the tip body by a collar 86. As shown in FIG. 7, in the illustrated embodiment, the manifold plate 82 includes snap-fit arms 90 that mate with one or more internal ribs or cleats 92 of a pod coupler 94 (e.g., a raised rib) of the tip body. The collar 86 includes one or more ribs or cleats 96 that mate with an exterior groove 98 defined by the coupler 94. This snap-fit connection facilitates assembly compared to using adhesive or other means of connection. In the illustrated embodiment, the bulb 80 and the collar 86 are formed separately, and the collar engages a flange 100 of the bulb to sandwich the flange (or other portion of the bulb) between the tip body 40 (e.g., pod coupler 94) and the collar. In another embodiment, the bulb 80 may be overmolded on the collar 86. It is believed overmolding (or co-molding) the bulb 80 and the collar 86 may facilitate proper assembly of the foodstuff additive dispenser 44, which in turn, inhibit leakage of the foodstuff additive from the dispensing tip assembly 16. In yet another embodiment, the bulb 80 may be overmolded on the manifold plate 82.

Figure 5:
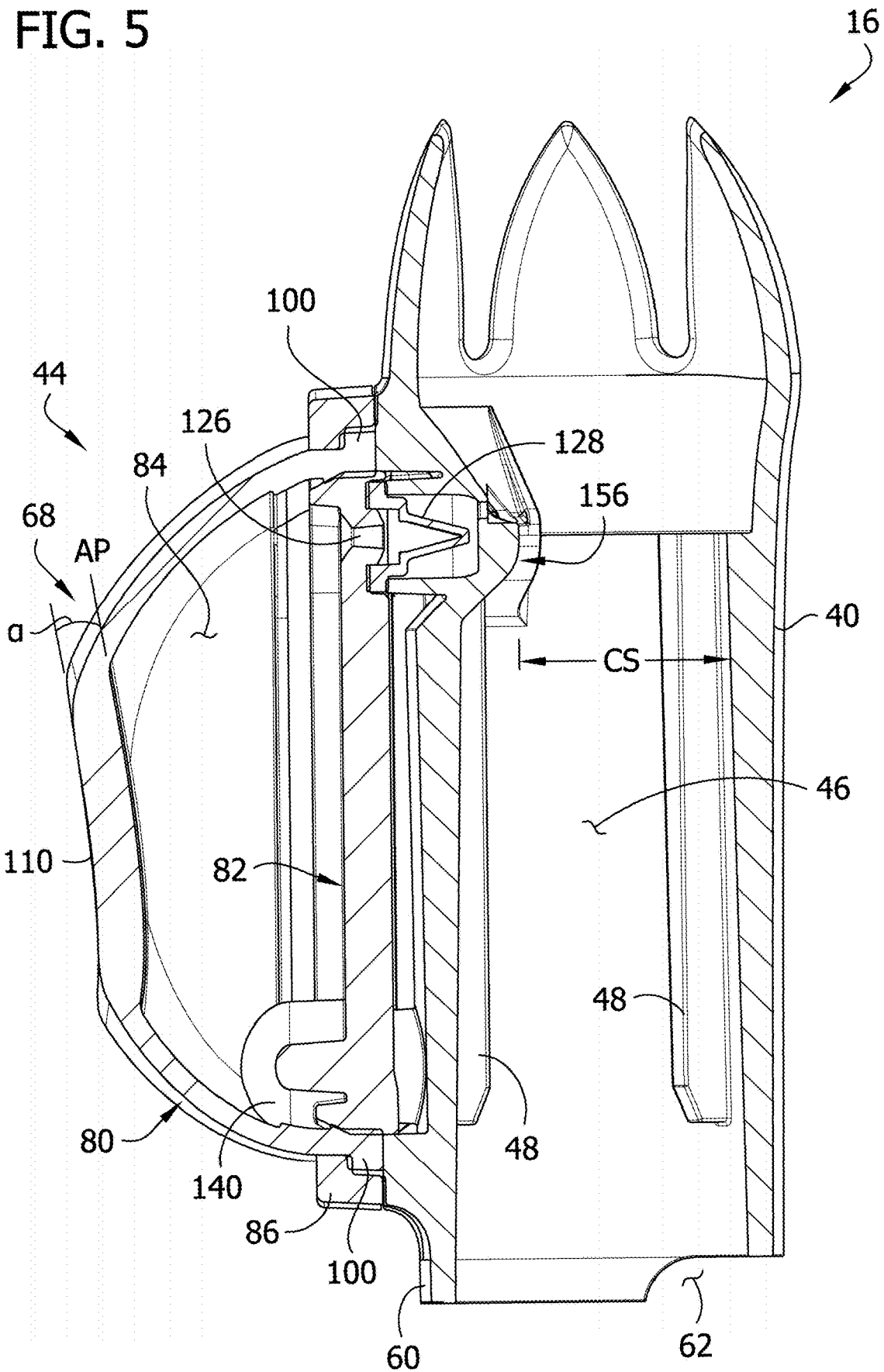
FIG. 5 is a cross section of the dispensing tip assembly taken in a plane through a first additive valve.
Figure 6:
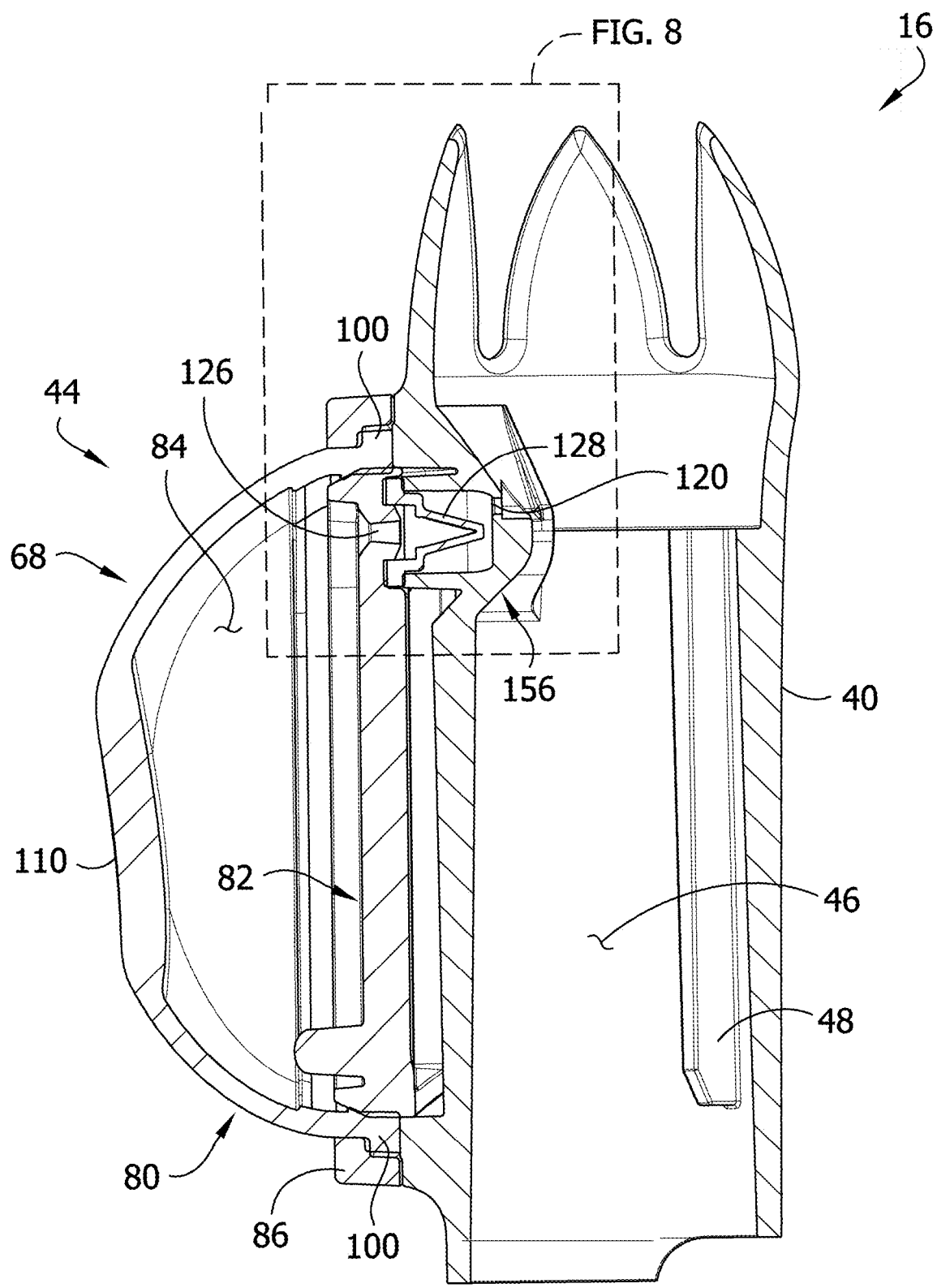
FIG. 6 is a cross section of the dispensing tip assembly taken in a plane through a second additive valve.
Figure 9:
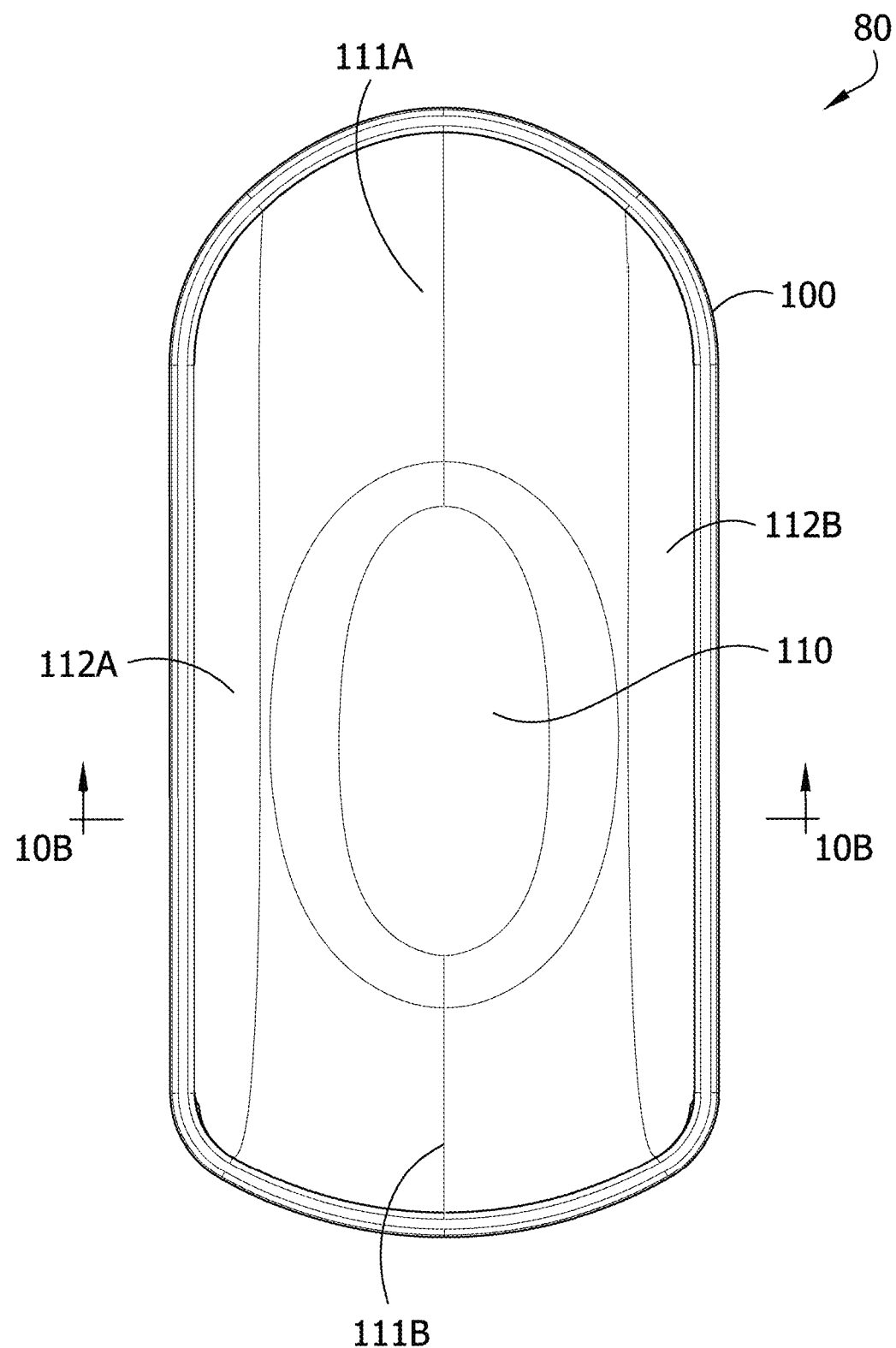
FIG. 9 is a front view of a bulb of the dispensing tip assembly.
Figure 10A:
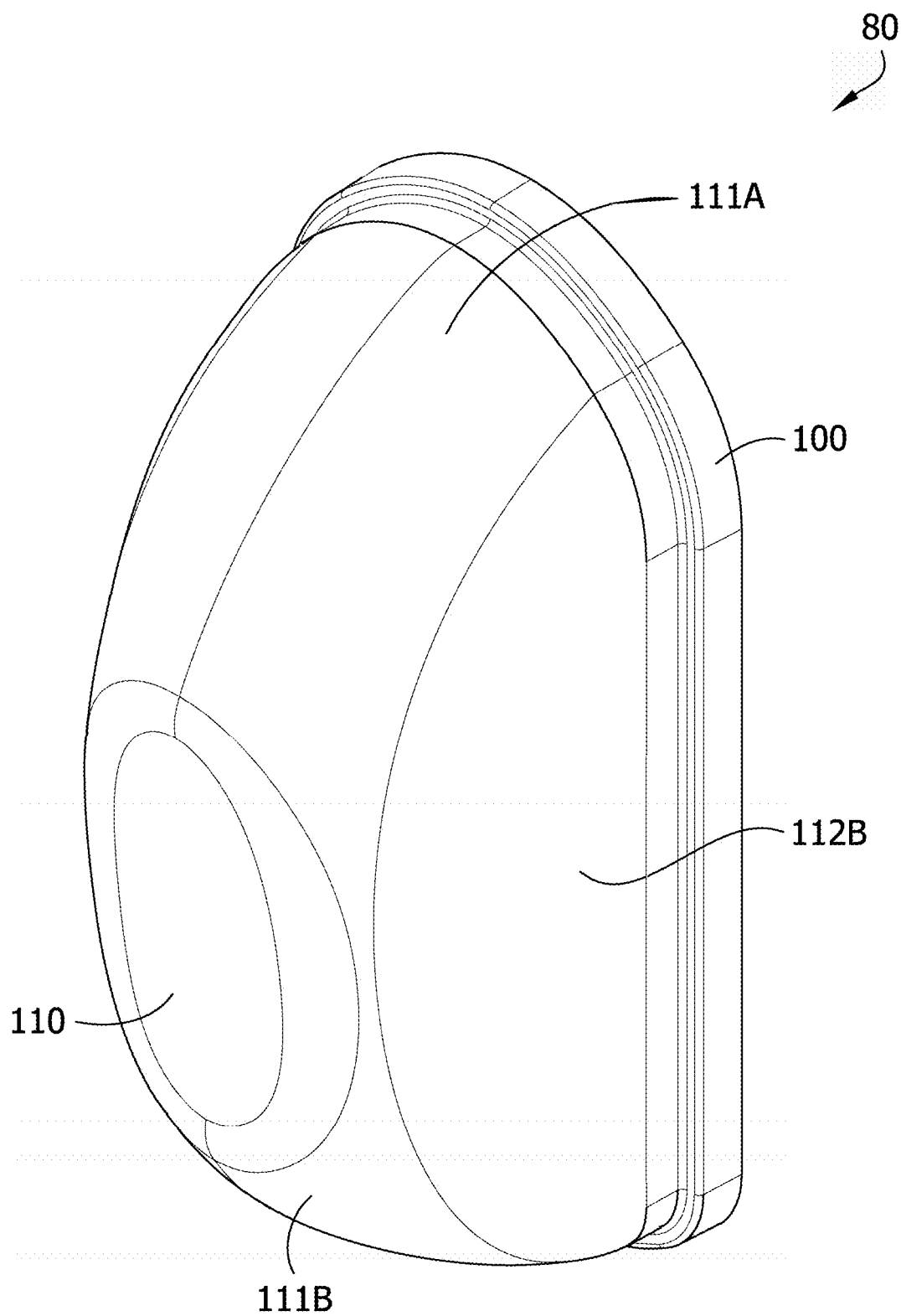
FIG. 10A is a perspective of the bulb.
Figure 10B:
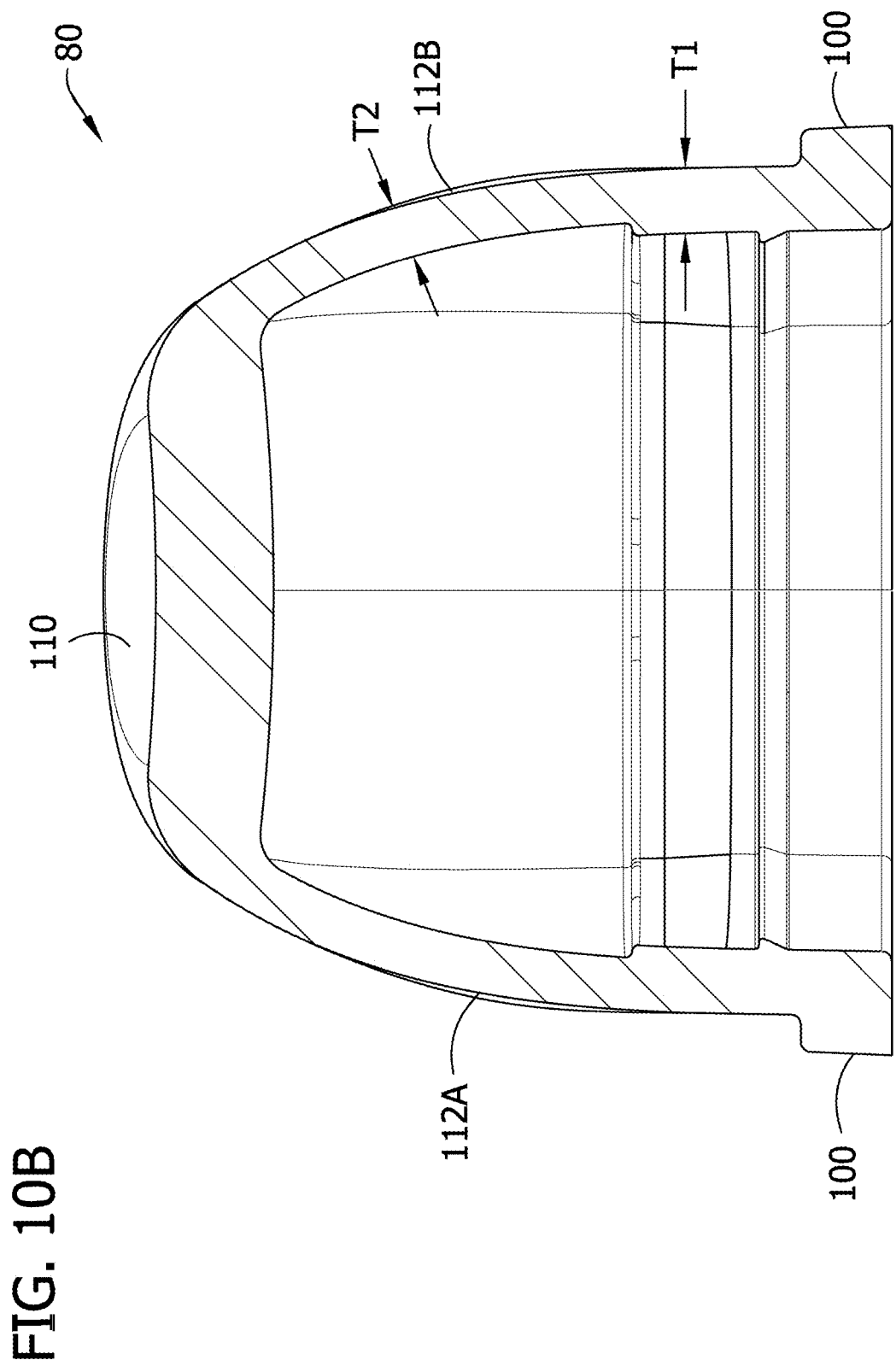
FIG. 10B is a cross section taken through the line 10B-10B in FIG. 9.

Referring to FIGS. 9-10B, the bulb 80 is generally resiliently compressible relative to the manifold plate 82 to expel a quantity of the foodstuff additive from the chamber 84 when a user depresses the bulb. In the illustrated embodiment, as shown in FIG. 9, a footprint of the bulb is generally oval with truncated left and right sides. The bulb 80 includes a wall having front portion that is generally rounded or dome-shaped extending from upper and lower ends of the bulb and including a truncated peak defining a front face 110 of the bulb. The front face 110 may be concave (as illustrated) to facilitate positioning of a finger thereon. The illustrated front face 110 has a generally oval perimeter to correspond generally to the shape of a fingertip of a user, although the front face may have other perimeter shapes. As illustrated, the front face 110 may be angled outward from a proximal end to a distal end, as shown in FIG. 5. This angle α may measure from about 2 degrees to about 5 degrees relative to an axial plane AP. The front portion has distal and proximal rounded portions 111A, 111B, respectively. In general, the length of the distal portion is greater than the length of the proximal portion 111A, 111B, whereby the volume of the pod at the distal portion is greater than the volume of the pod at the proximal portion. In this way, a volume of foodstuff additive adjacent additive openings 126 (described below) is greater than the volume of foodstuff additive adjacent an air port 140 when the pressurizable foodstuff container 10 turned upside down during dispensing (e.g., the foodstuff additive flows distally in the pod) to enable a sufficient volume of foodstuff additive to flow through the additive openings when the bulb 80 is depressed.

Left and right sides 112A, 112B, respectively, of the bulb 80 are generally truncated (but may still be somewhat rounded) from the front portion toward a rear portion of the bulb. As shown in cross sections of the bulb in FIGS. 4-6, a thickness of the bulb wall at the front face 110 is greater than the thickness of the bulb wall at the upper and lower portions of the front portion. As shown in cross section of bulb 80 in FIG. 10B, the thickness of the bulb wall at the front face 110 is greater than the thickness of the bulb wall at the left and right sides 112A, 112B. This configuration and design facilitates the depression of the bulb 80 to expel foodstuff additive into the tip body 40 and rebounding of the bulb after being depressed. As a non-limiting example, the thickness of the bulb wall at the front face may be from about 50% to about 200% or from about 75% or 150% greater than the thickness of the bulb wall at the left and right sides 112A, 112B and upper and lower portions 111A, 111B of the front portion. As shown in FIG. 10B, the thickness of the bulb wall (indicated as T1) adjacent flange 100 is greater than the thickness (indicated at T2) of the bulb wall at the left and right sides 112A, 112B to facilitate folding or buckling of the left and right side walls adjacent the junction of the different thicknesses T1, T2 to facilitate depression or collapsing of the bulb 80 when pressure is applied to the front face 110. The bulb 80 may be formed (e.g., molded) from a thermoplastic elastomer for example, or other material, such as rubber.

Figure 8:
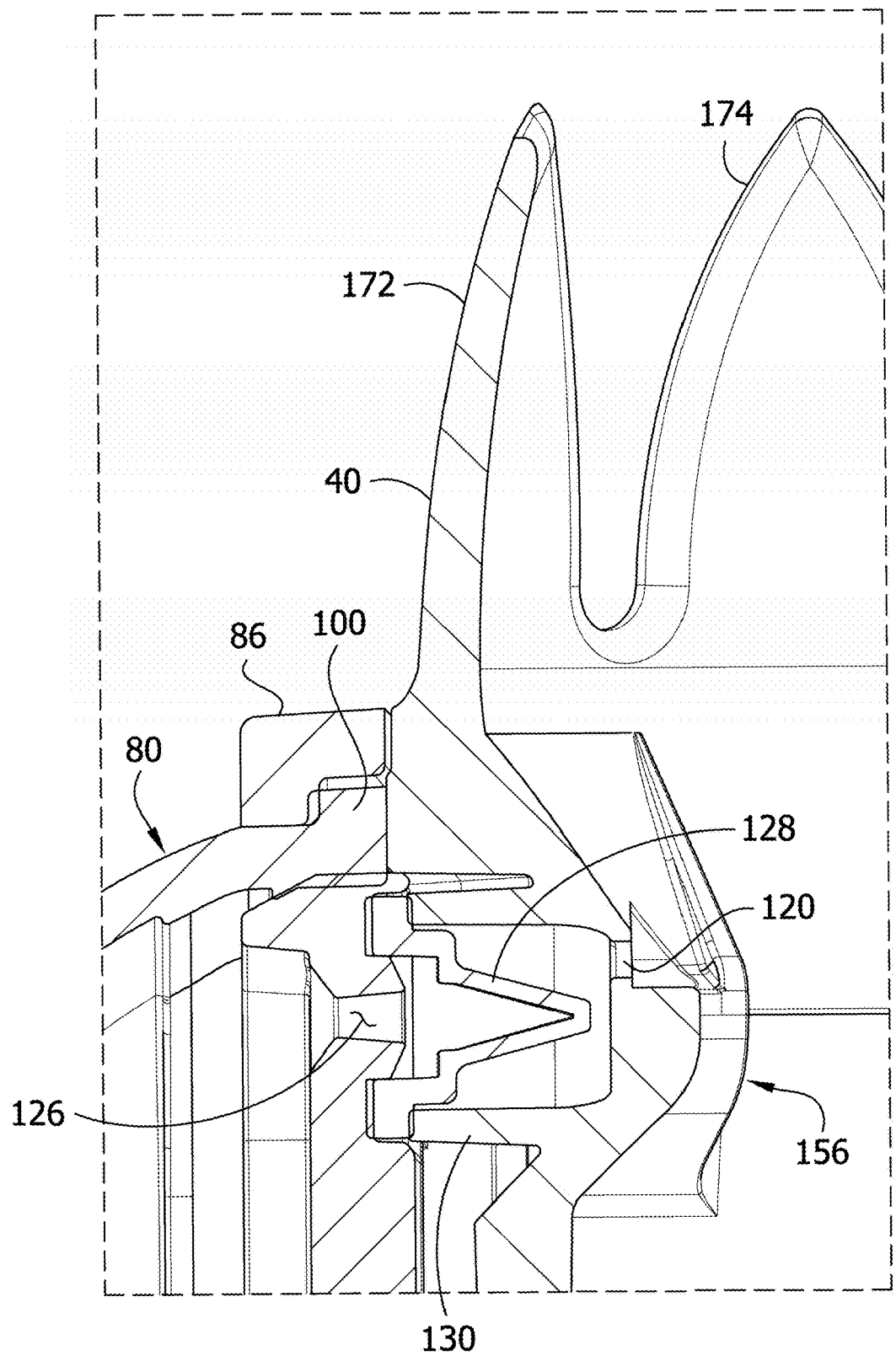
FIG. 8 is an enlarged view as indicated in FIG. 6.
Figure 11:
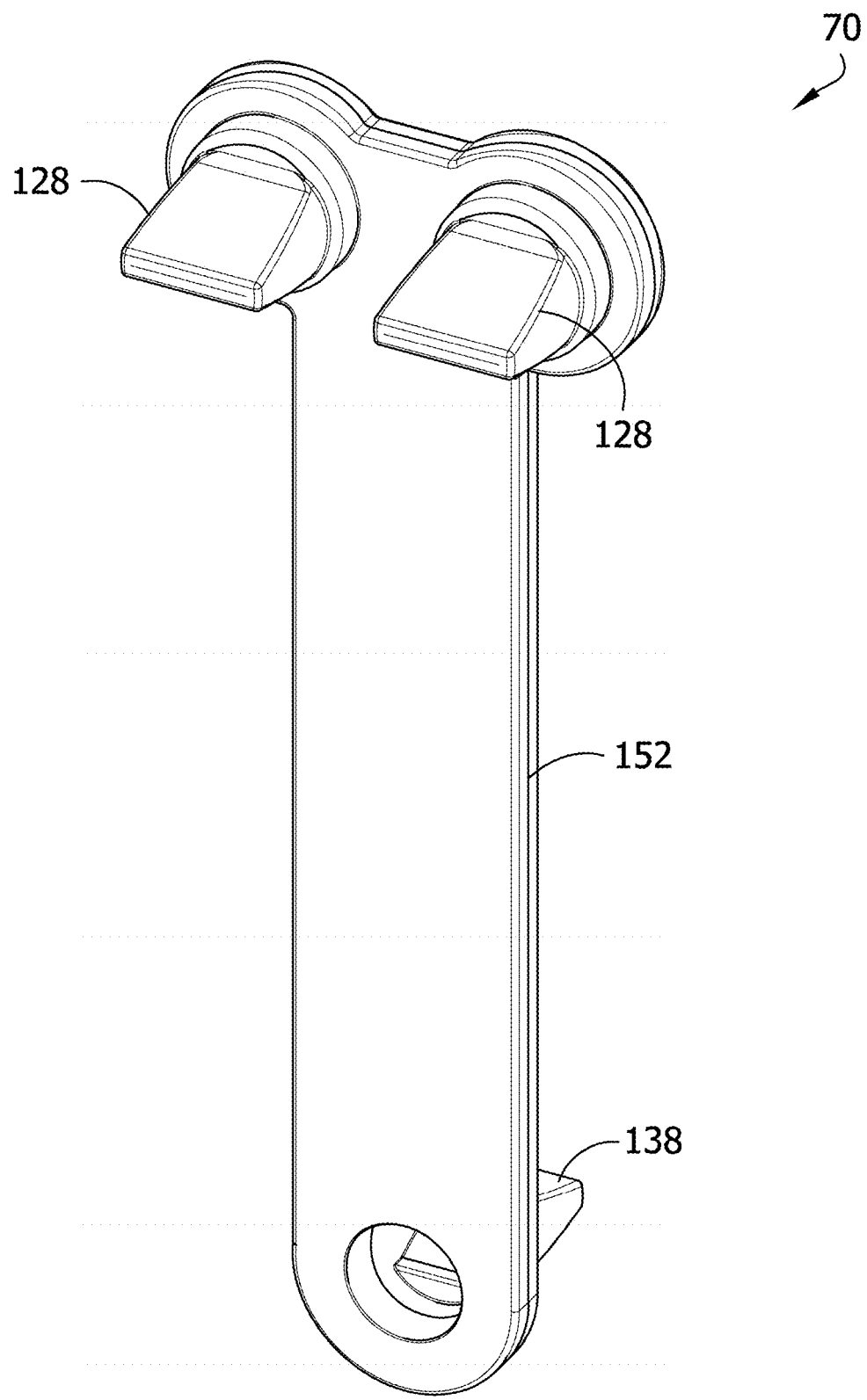
FIG. 11 is a perspective of a valve assembly of the dispensing tip assembly.
Figure 12:
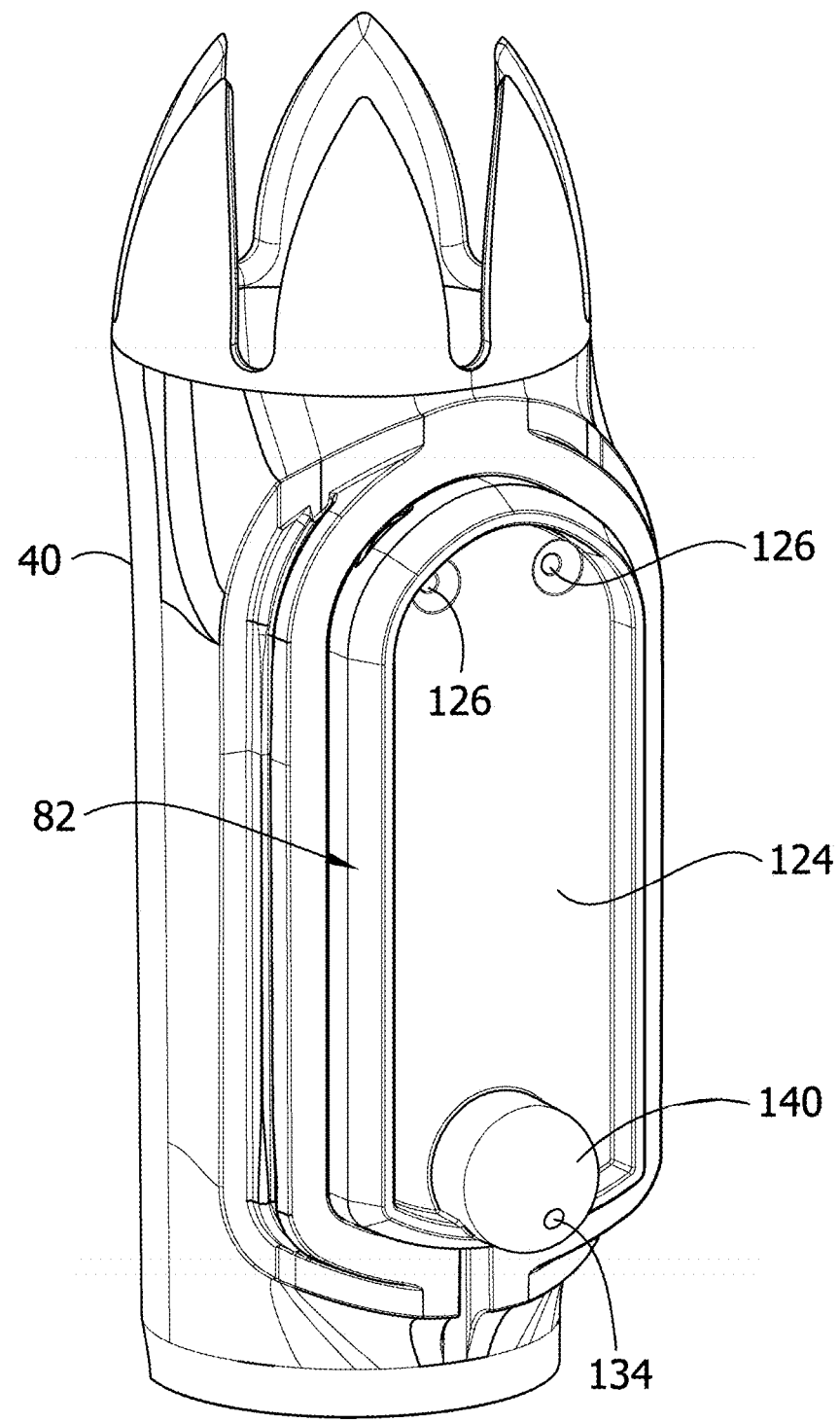
FIG. 12 is a perspective of the dispensing tip assembly, with the bulb and a collar removed therefrom.
Figure 13:
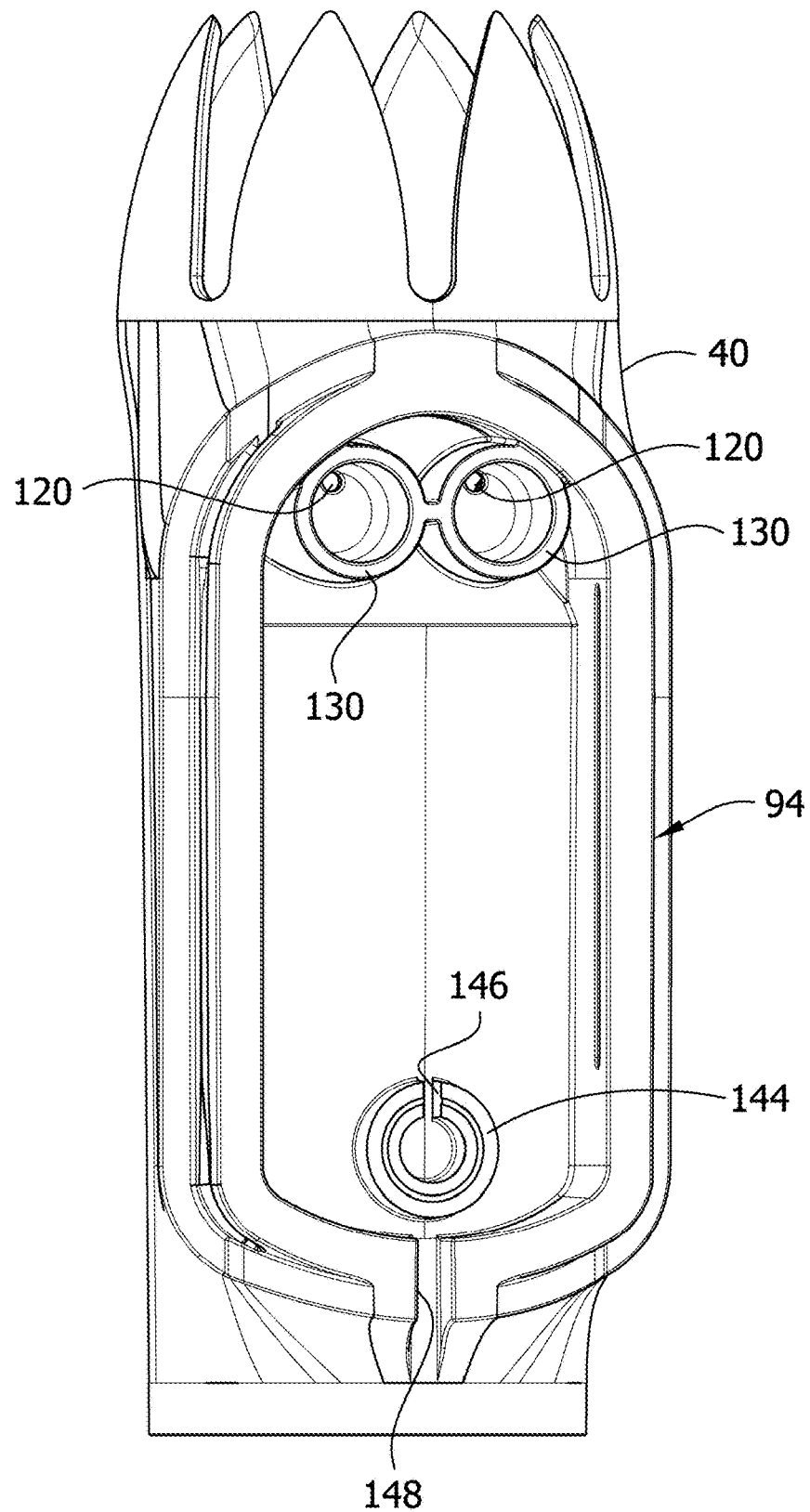
FIG. 13 is a perspective of the dispensing tip assembly, with the bulb, the collar, the additive valve assembly, and a manifold plate removed therefrom.

Referring to FIGS. 8, 11, and 12 the manifold plate 82 cooperates with the additive valve assembly 70, which in turn cooperates with an additive outlet 120 (i.e., one or more additive outlets, such as two) in the tip body 40 to selectively deliver foodstuff additive into the tip body, more specifically the internal flow passage 46. In the illustrated embodiment, a plate body 124 of the manifold plate 82 defines two additive openings 126 fluidly connecting the foodstuff additive dispenser to the internal flow passage 46, more specifically, fluidly connecting the additive chamber 84 with one or more additive valves 128 (e.g., check valves, such as duckbill valves) of the valve assembly 70. Outlets of the additive valves 128 fluidly communicate with the additive outlets 120 of the tip body 40. In one example, a single additive valve 128, rather than two or more as illustrated, may be in communication with the additive outlets 120. Moreover, in one or more embodiments, there may be a single additive outlet 120. The additive outlets 120 are explained in more detail below. In the illustrated embodiment, the duckbill additive valves 128 are received in respective additive ports 130 defined by the tip body 40. In one example, the additive ports 130 may be in fluid communication with one another (e.g., via a slit or passage) to evenly distribute pressure within the additive outlets 120 of the tip body 40. In the illustrated embodiment, the plate body 124 further defines an air outlet 134 fluidly connecting the additive chamber 84 with an air valve 138 (e.g., check valve, such as a duckbill valve) of the additive valve assembly 70. The illustrated air valve 138 is received in the air port 140 extending forward from the plate body 124. The air valve 138 is seated on a seat 144 (or boss) of the tip body 40. The seat 144 has an annular wall with a radial opening 146 in communication with the air valve 138. An opening 148 formed in a wall of the pod coupler 94 provides ambient air to the seat 144, and in turn, to the air valve 138. In the illustrated embodiment, the air valve 138 is adjacent a proximal end of the bulb 80, and the additive openings 126 are generally adjacent the distal end of the bulb. As explained above, the foodstuff additive flows distally as the container 10 is turned upside down, therefore, by disposing the additive openings 126 adjacent the distal end of the bulb 80 facilitates expulsion of the foodstuff additive into the additive openings. At the same time, the foodstuff additive flows away from the air valve 138 when the container 10 is turned upside down, which inhibits foodstuff additive from flowing through the air port 140 when the bulb is depressed.

In use, when a user depresses the bulb 80, the foodstuff additive is forced through the additive openings 126 in the plate body 124 and into the additive duckbill valves 128, whereupon the duckbill valves open and deliver the foodstuff additive to additive outlets 120 of the tip body 40. The air valve 138 remains closed during this time to inhibit the foodstuff additive from flowing through the air valve. Upon releasing the bulb 80, the rebounding force of the bulb draws ambient air along the path extending from the opening 148 in the wall of the pod coupler 94 through air valve 138 and into the additive chamber 84. In the illustrated embodiment, the opening 148 in the coupler wall is diametrically opposite (e.g., 180 degrees offset) from the radial opening 146 in the annular wall of the valve seat 144. This configuration inhibits potential leakage points.

Figure 14:
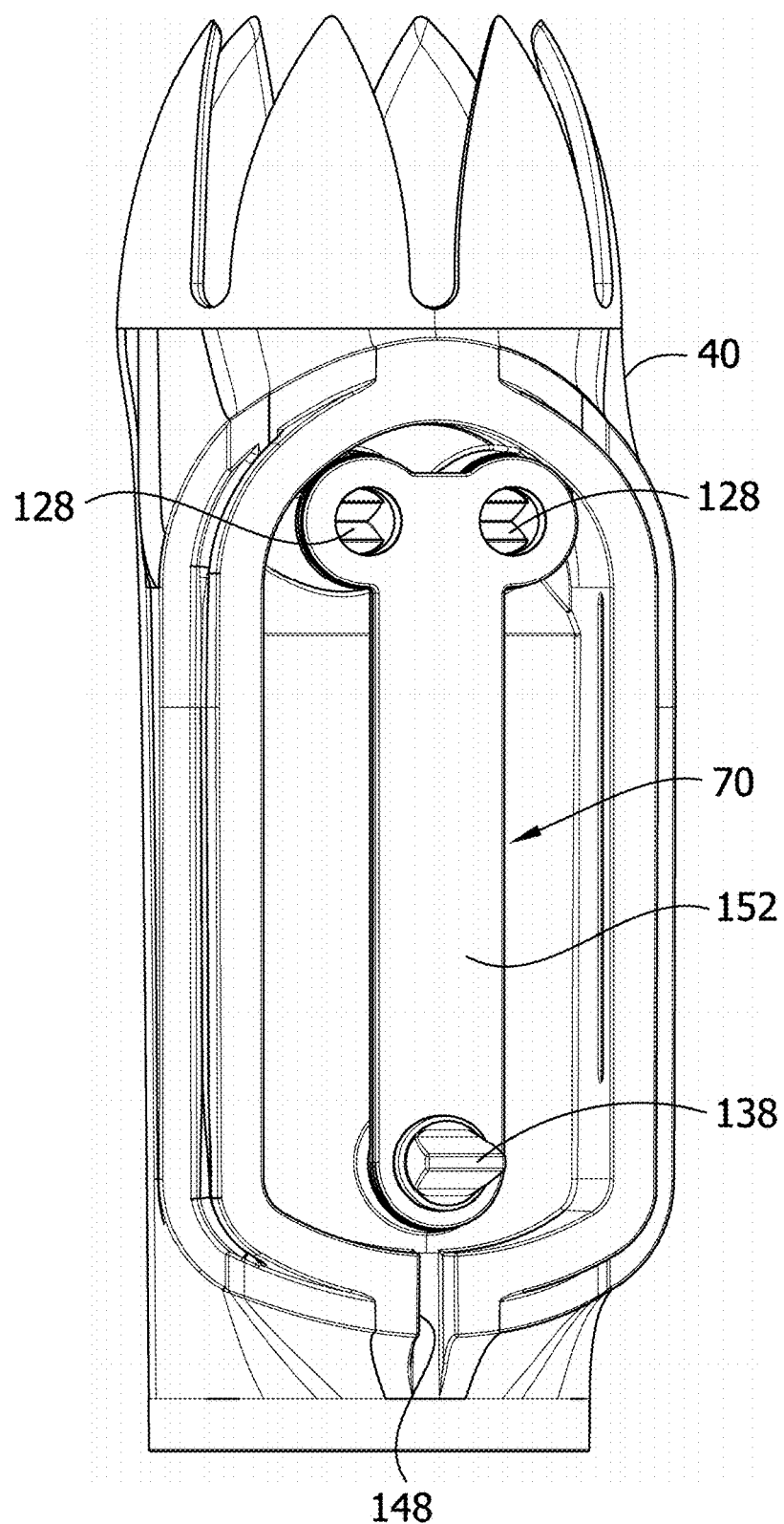
FIG. 14 is similar to FIG. 13, but included the additive valve assembly.
Figure 15:
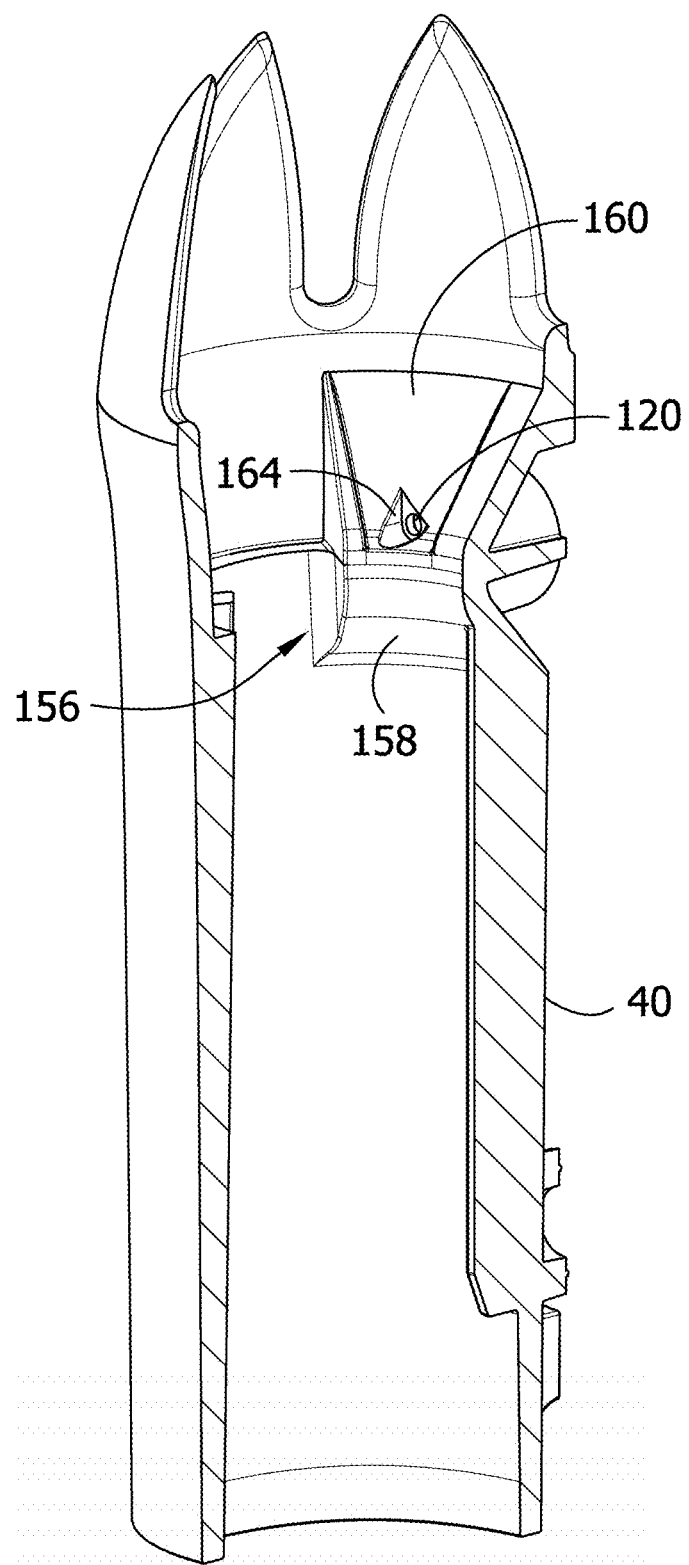
FIG. 15 is a cross-sectional perspective of a tip body of the dispensing tip assembly.
Figure 17:
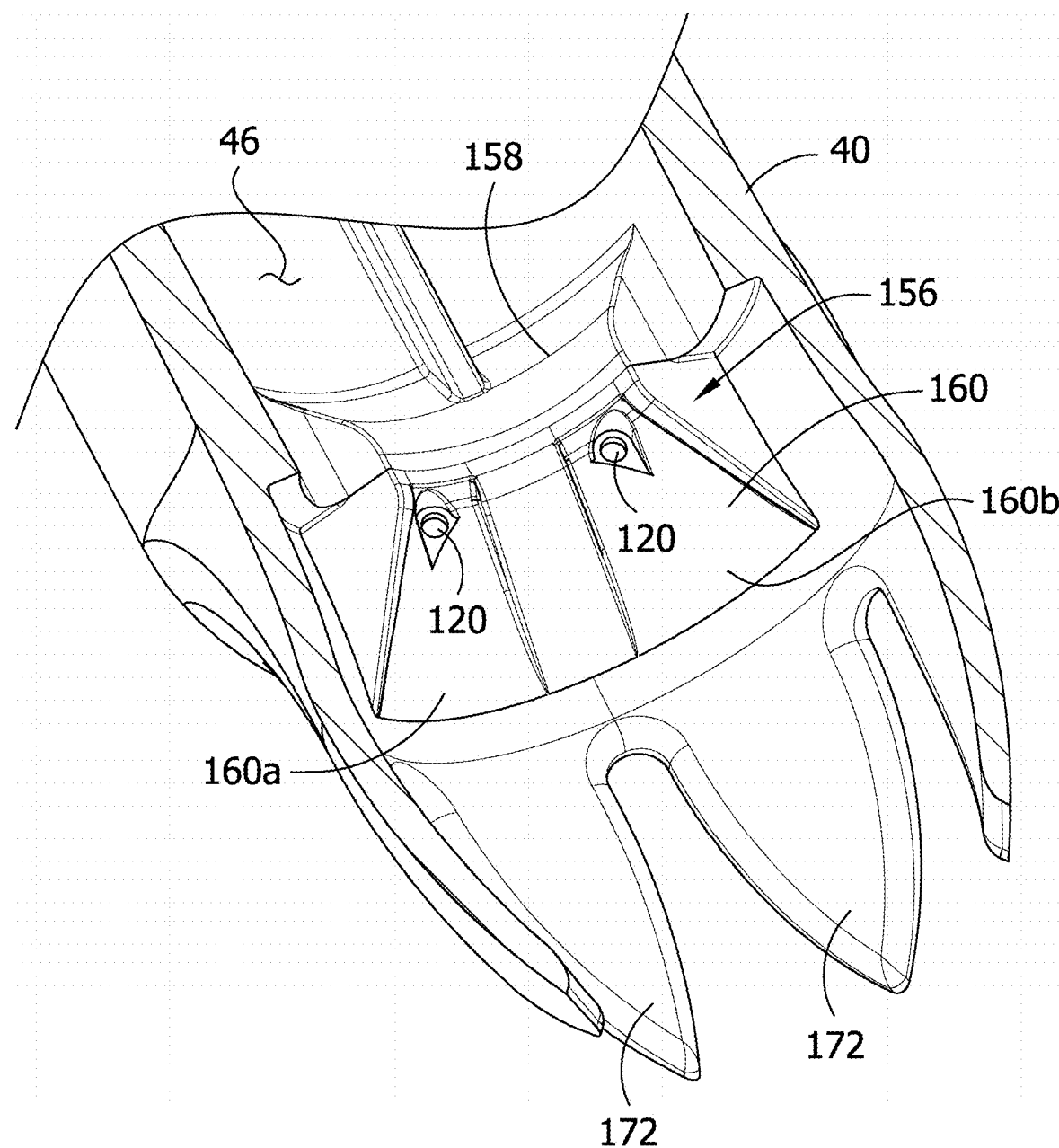
FIG. 17 is an enlarged, partial view of a cross-sectional perspective of the tip body.
Figure 18:
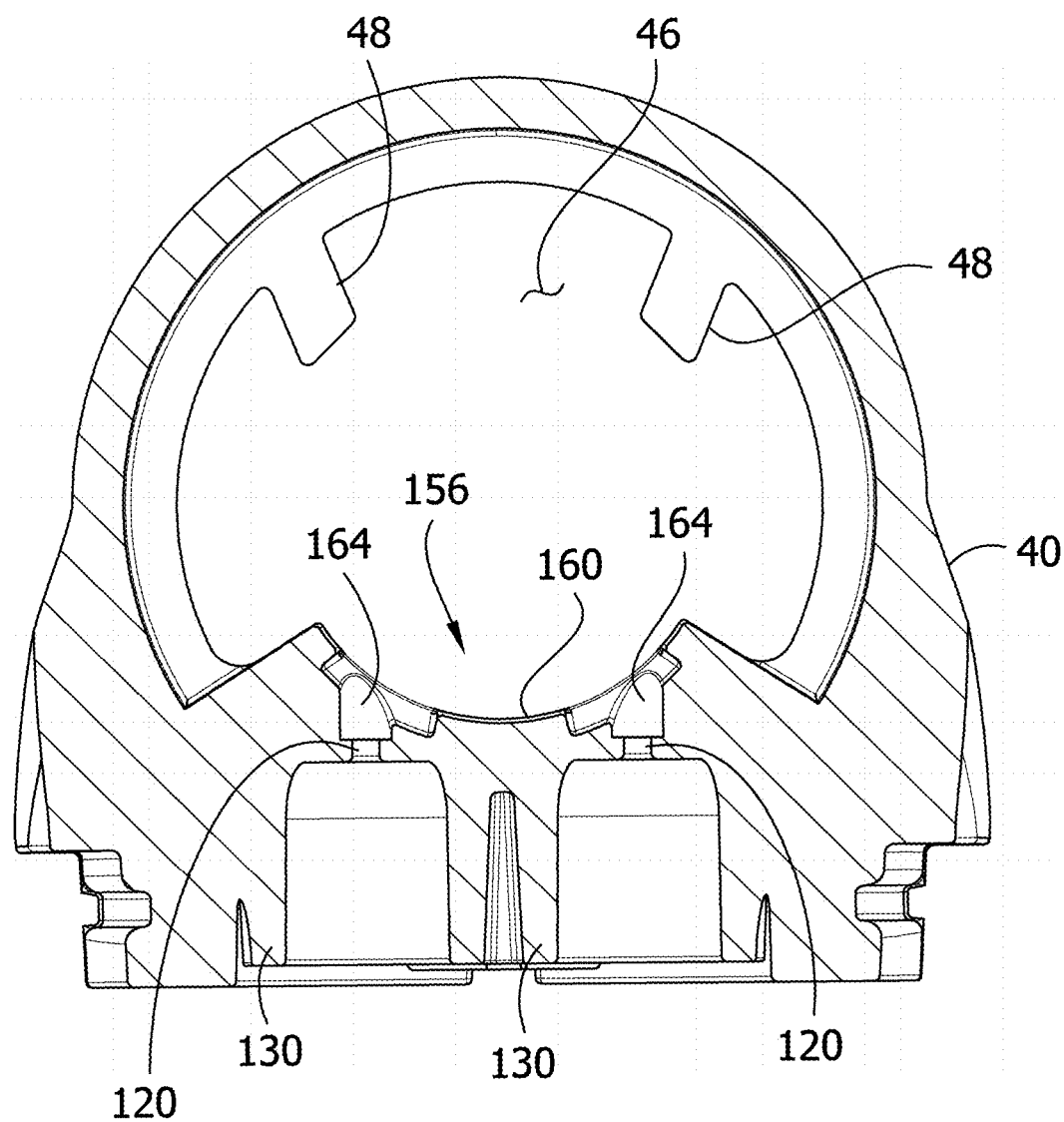
FIG. 18 is a cross section of the tip body.

Referring to FIGS. 11, 14 and 17, the illustrated additive valve assembly 70 includes the two additive valves 128 and the air valve 138 coupled to one another by a tether or strip 152. This facilitates the manufacturing and assembly of the dispensing tip assembly 16. The two additive valves 128 extend rearward from the strip 152 and the air valve 138 extends forward from the strip. The valve assembly 70 may be integrally formed as a one-piece, monolithic component, such as by molding. In another embodiment, the valve assembly 70 may include a single additive valve 128 in communication with two or more additive outlets 120 of the tip body 40.

Figure 16:
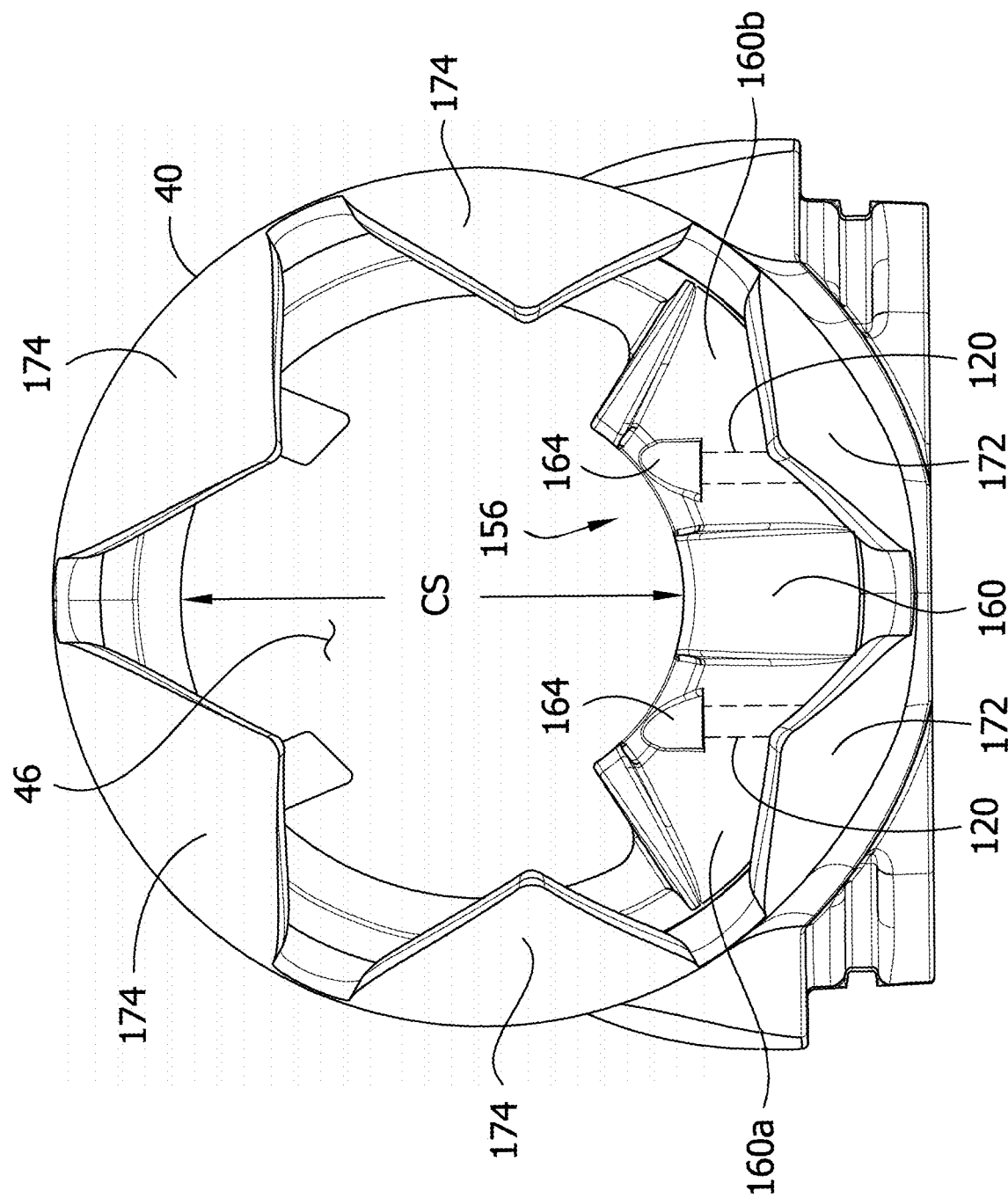
FIG. 16 is a top plan view of the tip body.

The tip body 40 is configured to relatively smoothly deliver the foodstuff additive to the foodstuff at the foodstuff is flowing through the tip body 40 so that the foodstuff additive is visible on the foodstuff as a stripe or swirl, as shown in FIG. 19 for example. In general, as shown in FIGS. 5 and 16), a constricted section or throat CS of the flow passage 46 within the tip body 40 forms a region of relatively lower pressure (i.e., low pressure zone) at the throat. In particular, the throat T of the flow passage 46 has a cross-sectional area that is less than the cross-sectional area of the flow passage upstream and downstream of the throat. In the illustrated embodiment explained in more detail below, the flow passage 46 is a convergent-divergent flow passage, where the throat CS functions as a choke resulting in a lower static pressure at the throat compared to the static pressure upstream of the throat. Thus, a low pressure zone is created in the tip body 40 at the throat, which is also known as a Venturi effect. The foodstuff additive is delivered to the flowing foodstuff at or generally adjacent (e.g., immediately downstream from) the throat. Accordingly, the additive outlet(s) 120 may be at or generally adjacent (e.g., immediately downstream from) the throat and the low pressure zone. In this way, the foodstuff additive is generally laid on the surface of the flowing foodstuff to create a visible swirl or layer of additive foodstuff on the dispensed combined product, rather than being overly intermixed with the foodstuff.

Referring to FIGS. 15-18, in the illustrated embodiment, one or more ramps 156 (broadly, a converging-diverging baffle) disposed on an interior surface of the tip body 40 create the constricted section or throat T of the flow passage 46. The ramp 156 includes an upstream surface or side 158 and a downstream surface or side 160. One or both of the sides 158, 160 may have an arcuate shape in a circumferential direction in the passage 46. The upstream side 158 slopes radially inward from its downstream end toward its upstream end, and the downstream side 160 slopes radially outward from its downstream end toward its upstream end. The upstream side 158 has a greater magnitude (e.g., average magnitude) of slope than the downstream side 160, so that the upstream side slopes more sharply than the downstream side. An apex section 161 is at the junction of the upstream and downstream sides 158, 160 and partially or at least partially defines the throat or the minimum cross-sectional area of the throat T. The downstream side 160 flares widthwise from the apex section 161 toward its downstream end to enable the flowing product to expand as it flows on the downstream side. In this embodiment, each of the additive outlets 120 are disposed on the downstream side 160 of the ramp 156 and are in communication with a cavity 164 defined in the downstream side. In the illustrated embodiment, the additive outlets 120 are adjacent the apex section 161. In other embodiments, the additive outlets 120 may be located at the apex section 161 or other location of the low pressure zone.

The ramp 156 creates a zone of low pressure at the apex 161 and downstream side 160 as the foodstuff flows over the upstream side 158 and apex of the ramp 156 and passes over the downstream side. The foodstuff additive expelled from the additive outlets 120 in this zone of low pressure. This reduces intermixing of the foodstuff additive within the foodstuff, which would lead to a less distinguishable appearance between the foodstuff and the foodstuff additive. It is also believed that the ramp 156 or other structure creating a constricted section or throat CS increases laminar flow of the flowing foodstuff, which is typically more turbulent downstream of the ramp. It is believed this further facilitates the foodstuff additive laying on and not overly intermixing with the flowing foodstuff within the tip body 40. The tip assembly 16 may have other structures and configurations for producing the zone of low pressure at which the foodstuff additive is applied to the flowing foodstuff in the tip assembly.

Referring to FIGS. 16 and 17, it is believed that having the additive outlets 120 within separate cavities 164 facilitates maintaining separation of the foodstuff additive stripes as they are delivered to the flowing product, whereby the additive foodstuff stripes are visibly distinct from one another in the dispensed product. Thus, in general the cavities 164 define barriers separating the additive outlets 120 and the foodstuff additive as it is dispensed from the additive outlets. The cavities 164 also may control the shape and size of the foodstuff additive stripe delivered to the flowing foodstuff in addition to the direction in which the foodstuff additive is delivered (e.g., generally in the downstream direction). In the illustrated embodiment, the downstream surface 160 defines first and second recessed portions 160a, 160b in communication with the first and second additive foodstuff outlets 120 (and associated cavities 164), respectively, to maintain separation of the additive foodstuff stripes as the foodstuff flows along the downstream surface 160 and produce wider additive foodstuff stripes on the dispensed combined product (e.g., the widths of the stripes increase as it flows along the recessed portions 160a, 160b). The first and second recessed portions 160a, 160b are generally channel-shaped with opposite sidewalls. The illustrated recessed portions 160a, 160b share a common sidewall therebetween. The illustrated recessed portions 160a, 160b have respective widths flaring (increasing) toward the downstream end of the downstream surface 160. The first and second foodstuff additive outlets 120 and the associated cavities 164 are disposed within the perimeter or footprint of the respective first and second recessed portions 160a, 160b.

In the illustrated embodiment, the tip body 40 includes decorating petals at its downstream end. The petals include one or more first petals 172 (e.g., two first petals) and one or more second petals 174 (e.g. four second petals). The first and second petals 172, 174 extend or curve radially inwardly. As can be seen in FIGS. 4 and 16, the first petals 172 have a flatter axial slope or curvature compared to the second petals 174 such that the distal ends of the second petals extend radially inward a greater radial distance than the distal ends of the first petals. The first petals 172 are generally axially aligned with the respective additive foodstuff outlets 160 so that the surface of the flowing foodstuff that includes the applied foodstuff additive flows along the first petals. In particular, in the illustrated embodiment, the first petals 172 are generally axially aligned with respective recessed portions 160a, 160b of the downstream surface 160. As an example, a width of a proximal end of each first petal 172 may correspond generally to the width of the corresponding recessed portion, as can be seen in FIG. 17, for example. The relative flat axial slopes or curvatures of the first petals 172 are believed to inhibit over intermixing of the additive foodstuff and the foodstuff to maintain the visible appearance of the stripes on the surface of the dispensed combined foodstuff.

One example of assembling the dispensing tip assembly 16 will now be explained with reference to the illustrated embodiment. The additive valves 128 are aligned with the additive ports 130 of the tip body, such as for example, inserting the valves into the ports. The air valve 138 is seated on the seat 144. In the illustrated embodiment, the tether enables the air valve 138 to be properly seated on the seat 144 when the valves 128 are received in the additive ports 130, thereby facilitating proper alignment. With the valves 128, 138 proper located on the tip body 40, the manifold plate 82 is snap-fitted onto the pod coupler 94, such as by using a press, so that the valves 128. 138 are captured between the manifold plate and the tip body 40.

In the illustrated embodiment, the collar 86 is coupled to the bulb 80 such as by inserting the bulb into the opening of the collar. In another embodiment described above, the collar 86 and the bulb 80 are co-molded so that the collar and the bulb are already coupled to one another and the bulb is sealed to the collar. The bulb 80 is filled with foodstuff additive through the open side of the bulb, which is a large opening and enables quick filling of the bulb. After filling the bulb 80 and after connecting the manifold 82 to the tip body, the collar 86 is snap-fitted on the pod coupler 94, such as by using a press, whereby the dispensing tip assembly 16 with the foodstuff additive is fully assembled.

The components of the tip assembly 10 may be formed from suitable polymeric material, for example. In one example, the components may be molded or otherwise formed.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A pressurized foodstuff container comprising:
   a container body containing a flowable foodstuff therein;
   a foodstuff valve assembly coupled to the container body and configured to selectively release the flowable foodstuff from the container body; and
   a dispensing tip assembly including
      a tip body having an upstream end and an open downstream end and defining an internal flow passage through which the flowable foodstuff released by the foodstuff valve assembly flows,
      a foodstuff additive dispenser coupled to the tip body, the foodstuff additive dispenser containing a foodstuff additive therein, the foodstuff additive dispenser configured to selectively enable delivery of the foodstuff additive into the internal flow passage of the tip body,
   wherein the tip body includes an internal ramp, the internal ramp including an upstream side, a downstream side, and an apex section between the upstream and downstream sides, wherein the apex section of the internal ramp at least partially defines a throat of the internal flow passage having a cross-sectional area that is less than a cross-sectional area of the internal flow passage upstream and downstream of the throat.

2. The pressurized foodstuff container set forth in claim 1, wherein the downstream side of the internal ramp has an arcuate cross-sectional shape.

3. The pressurized foodstuff container set forth in claim 2, wherein the upstream side of the internal ramp has an arcuate cross-sectional shape.

4. The pressurized foodstuff container set forth in claim 1, wherein the downstream side flares widthwise from the apex section toward a downstream end of the downstream side.

5. The pressurized foodstuff container set forth in claim 1, wherein the internal ramp is a converging-diverging baffle.

6. The pressurized foodstuff container set forth in claim 1, wherein the internal ramp is adjacent the open downstream end of the tip body.

7. The pressurized foodstuff container set forth in claim 1, wherein the upstream side slopes radially inward from a downstream end toward an upstream end thereof, and the downstream side slopes radially outward from a downstream end toward an upstream end thereof.

8. The pressurized foodstuff container set forth in claim 7, wherein the upstream side has a greater average magnitude of slope than the downstream side so that the upstream side slopes more sharply than the downstream side.

9. The pressurized foodstuff container set forth in claim 1, wherein the tip body has an additive outlet fluidly connecting the foodstuff additive dispenser to the internal flow passage to deliver the foodstuff additive to the internal flow passage, wherein the additive outlet is defined by the internal ramp.

10. The pressurized foodstuff container set forth in claim 9, wherein the additive outlet is at or adjacent the apex section of the internal ramp.

11. The pressurized foodstuff container set forth in claim 9, wherein the additive outlet is at the downstream side adjacent the apex section of the internal ramp.

12. A pressurized foodstuff container comprising:
    a container body containing a flowable foodstuff therein, wherein the flowable foodstuff is under pressure in the container body;
    a foodstuff valve assembly coupled to the container body and configured to selectively release the flowable foodstuff from the container body; and
    a dispensing tip including a tip body having an upstream end and an open downstream end and defining an internal flow passage through which the flowable foodstuff released by the foodstuff valve assembly flows,
    wherein the tip body includes an internal ramp, the internal ramp including an upstream side, a downstream side, and an apex section between the upstream and downstream sides, wherein the apex section of the internal ramp at least partially defines a throat of the internal flow passage having a cross-sectional area that is less than a cross-sectional area of the internal flow passage upstream and downstream of the throat.

* * * * *